(12) United States Patent
Sakurai

(10) Patent No.: US 7,200,584 B2
(45) Date of Patent: Apr. 3, 2007

(54) TIME SERIES PATTERN EXTRACTION APPARATUS AND METHOD

(75) Inventor: Shigeaki Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 10/770,580

(22) Filed: Feb. 4, 2004

(65) Prior Publication Data
US 2004/0186835 A1    Sep. 23, 2004

(30) Foreign Application Priority Data
Mar. 20, 2003   (JP) ............................ P2003-078475

(51) Int. Cl.
G06F 17/00 (2006.01)
G06N 7/00 (2006.01)
G06N 7/08 (2006.01)
G06N 5/02 (2006.01)

(52) U.S. Cl. .......................................... 706/58; 706/46
(58) Field of Classification Search ................. 706/12, 706/45–46, 48, 58, 61
See application file for complete search history.

(56) References Cited

U.S. PATENT DOCUMENTS

| 5,265,222 | A  | * | 11/1993 | Nishiya et al. ................ 706/10 |
| 6,263,455 | B1 | * | 7/2001  | Bannister ...................... 714/25 |
| 6,618,725 | B1 | * | 9/2003  | Fukuda et al. .................. 707/6 |
| 6,792,145 | B2 | * | 9/2004  | Gay ............................ 705/30 |
| 2002/0083093 | A1 | * | 6/2002 | Goodisman et al. ........ 707/511 |
| 2003/0229471 | A1 | * | 12/2003 | Guralnik et al. ............ 702/182 |
| 2006/0074824 | A1 | * | 4/2006 | Li ............................... 706/20 |

FOREIGN PATENT DOCUMENTS

| JP | 02-131181 | * | 5/1990 |
| JP | 06-096052 |   | 4/1994 |
| JP | 07-036700 | * | 2/1995 |
| JP | 08-095949 |   | 4/1996 |
| JP | 2001-175735 |   | 6/2001 |
| JP | 2002-351899 | * | 12/2002 |

OTHER PUBLICATIONS

Srikant, R., & Agrawal, R. "Mining sequential patterns: Generalizations and performance improvements" Proc. of the Fifth Int'l Conference on Extending Database Technology (EDBT). Avignon, France. Mar. 1996.*

(Continued)

*Primary Examiner*—David Vincent
*Assistant Examiner*—Benjamin Buss
(74) *Attorney, Agent, or Firm*—Finnegan, Henderson, Farabow, Garrett & Dunner, L.L.P.

(57) ABSTRACT

A first time series data includes a plurality of element sets each including numeric data and text data. A numeric key concept of the numeric data is extracted from each element set of the first time series data. A text key concept of the text data is extracted from each element set of the first time series data. A second time series data corresponding to the first time series data is generated. In the second time series data, each element set includes the numeric key concept and the text key concept. A support of at least one combination of each numeric key concept and each text key concept is calculated from the plurality of element sets of the second time series data. The support is a degree belonging to the numeric key concept or the text key concept. A frequent time series pattern is extracted from the second time series data by referring to the support.

20 Claims, 17 Drawing Sheets

OTHER PUBLICATIONS

Srikant et al.; "Mining Sequential Patterns: Generalizations and Performance Improvements"; Proc. of the 5$^{TH}$ International Conference Extending Database Technology, (1996) Only pp. 3,5,7,9,11,13,15,& 17 supplied.

Pei et al.; "Prefixspan: Mining Sequential Patterns Efficiently by Prefix-Projected Pattern Growth"; Proc. of International Conference of Data Engineering, pp. 215-224 (2001).

* cited by examiner

| DATE / NAME | 1 | 2 | 3 | 4 | 5 |
|---|---|---|---|---|---|
| A | 6H, WORK ADVANCED IN GOOD CONDITION. | 4H, WORK GOT INTO TROUBLE. | 2H, WORK WAS FINISHED AS SCHEDULED. | 2H, MEETING WAS FINISHED WITHOUT PROBLEM. | 0H, I TAKE A REFRESH VACATION. |
| B | 2H, WORK ADVANCED AS SCHEDULED. | 5H, WORK WAS LATE FOR SCHEDULE. | 3H, WORK ADVANCED AS SCHEDULED. | 5H, PROBLEM OCCURRED. | 0H, I CATCH A COLD. |
| C | 0H, MEETING GOT INTO TROUBLE. | 0H, MEETING WAS FINISHED WITHOUT PROBLEM. | 5H, MEETING GOT COMPLICATED. | 4H, PROBLEM OCCURRED IN MEETING. | 0H, I HAVE A FEVER. |
| D | 5H, CODING GOT INTO TROUBLE. | 0H, CODING WAS LATE FOR SCHEDULE. | 0H, DEBUG WAS FINISHED AS SCHEDULED. | 2H, MEETING WAS FINISHED WITHOUT PROBLEM. | 4H, DESIGN GOT INTO TROUBLE. |
| E | 4H, DESIGN WAS LATE FOR SCHEDULE. | 6H, DESIGN WAS LATE FOR SCHEDULE. | 2H, CODING ADVANCED AS SCHEDULED. | 0H, I HAVE A HIGH FEVER. | 0H, I CATCH A COLD. |
| F | 0H, WORK ADVANCED AS SCHEDULED. | 4H, SCHEDULE ADJUSTMENT GOT INTO TROUBLE. | 6H, DEBUG ADVANCED OVER SCHEDULED. | 2H, PROBLEM OCCURRED IN PROGRAM. | 0H, I ATTEND A MEMORIAL SERVICE. |

FIG.2

| DATE\NAME | 1 | 2 | 3 | 4 | 5 |
|---|---|---|---|---|---|
| A | (LONG,0.50)<br>(VERY LONG,0.50)<br>POSITIVE FEELING | (LONG,1.00)<br>POSITIVE FEELING | (NORMAL,0.50)<br>(LONG,0.50)<br>USUAL | (NORMAL,0.50)<br>(LONG,0.50)<br>USUAL | (NORMAL,1.00)<br>RECREATION |
| B | (NORMAL,0.50)<br>(LONG,0.50)<br>USUAL | (LONG,0.75)<br>(VERY LONG,0.25)<br>NEGATIVE FEELING | (NORMAL,0.25)<br>(LONG,0.75)<br>USUAL | (LONG,0.75)<br>(VERY LONG,0.25)<br>NEGATIVE FEELING | (NORMAL,1.00)<br>ABSENCE DUE TO ILLNESS |
| C | (NORMAL,1.00)<br>NEGATIVE FEELING | (NORMAL,1.00)<br>USUAL | (LONG,0.75)<br>(VERY LONG,0.25)<br>NEGATIVE FEELING | (LONG,1.00)<br>NEGATIVE FEELING | (NORMAL,1.00)<br>ABSENCE DUE TO ILLNESS |
| D | (LONG,0.75)<br>(VERY LONG,0.25)<br>POSITIVE FEELING | (NORMAL,1.00)<br>NEGATIVE FEELING | (NORMAL,1.00)<br>USUAL | (NORMAL,0.50)<br>(LONG,0.50)<br>USUAL | (LONG,1.00)<br>POSITIVE FEELING |
| E | (LONG,1.00)<br>NEGATIVE FEELING | (LONG,0.50)<br>(VERY LONG,0.50)<br>NEGATIVE FEELING | (NORMAL,0.50)<br>(LONG,0.50)<br>USUAL | (NORMAL,1.00)<br>ABSENCE DUE TO ILLNESS | (NORMAL,1.00)<br>ABSENCE DUE TO ILLNESS |
| F | (NORMAL,1.00)<br>USUAL | (LONG,1.00)<br>NEGATIVE FEELING | (LONG,0.50)<br>(VERY LONG,0.50)<br>POSITIVE FEELING | (SHORT,0.50)<br>(NORMAL,1.00)<br>NEGATIVE FEELING | (NORMAL,1.00)<br>PRIVATE |

FIG.6

| OBJECT PATTERN | | |
|---|---|---|
| (NORMAL,USUAL) | | |
| | NAME | SUPPORT |
| | A | max (0.50,0.50) |
| | B | max (0.50,0.25) |
| | C | max (1) |
| | D | max (1,0.50) |
| | E | max (0.50) |
| | F | max (1.00) |

FIG.7

| PATTERN | SUPPORT |
|---|---|
| (NORMAL,USUAL) | 4.50 |
| (LONG,NEGATIVE FEELING) | 3.75 |
| (NORMAL,ABSENCE DUE TO ILLNESS) | 3.00 |
| (LONG,POSITIVE FEELING) | 2.50 |
| (NORMAL,NEGATIVE FEELING) | 2.50 |
| (LONG,USUAL) | 2.25 |

FIG.8

| OBJECT PATTERN | |
|---|---|
| (LONG,NEGATIVE FEELING), (NORMAL,ABSENCE DUE TO ILLNESS) | SUPPORT |

| NAME | SUPPORT |
|---|---|
| A | 0.00 |
| B | max (min(0.75,1.00),min(0.75,1.00)) |
| C | max (min(0.75,1.00),min(1.00,1.00)) |
| D | 0.00 |
| E | max (min(1.00,1.00),min(1.00,1.00),min(0.50,1.00),min(0.50,1.00)) |
| F | 0.00 |

FIG.9

| PATTERN | SUPPORT |
|---|---|
| (LONG,NEGATIVE FEELING),(NORMAL,ABSENCE DUE TO ILLNESS) | 2.75 |
| (NORMAL,USUAL),(LONG,NEGATIVE FEELING) | 2.50 |
| (NORMAL,USUAL),(NORMAL,ABSENCE DUE TO ILLNESS) | 2.00 |
| (NORMAL,NEGATIVE FEELING),(NORMAL,USUAL) | 2.00 |
| (LONG,NEGATIVE FEELING),(LONG,NEGATIVE FEELING) | 2.00 |

FIG.10

| PATTERN | SUPPORT |
|---|---|
| (LONG,NEGATIVE FEELING),(LONG,NEGATIVE FEELING),(NORMAL,ABSENCE DUE TO ILLNESS) | 2.00 |

FIG.11

| PATTERN | SUPPORT |
|---|---|
| (NORMAL,USUAL) | 4.50 |
| (LONG,NEGATIVE FEELING) | 3.75 |
| (NORMAL,ABSENCE DUE TO ILLNESS) | 3.00 |
| (LONG,POSITIVE FEELING) | 2.50 |
| (NORMAL,POSITIVE FEELING) | 2.50 |
| (LONG,USUAL) | 2.25 |
| (LONG,NEGATIVE FEELING),(NORMAL,ABSENCE DUE TO ILLNESS) | 2.75 |
| (NORMAL,USUAL),(LONG,NEGATIVE FEELING) | 2.50 |
| (NORMAL,USUAL),(NORMAL,ABSENCE DUE TO ILLNESS) | 2.00 |
| (NORMAL,NEGATIVE FEELING),(NORMAL,USUAL) | 2.00 |
| (LONG,NEGATIVE FEELING),(LONG,NEGATIVE FEELING) | 2.00 |
| (LONG,NEGATIVE FEELING),(LONG,NEGATIVE FEELING),(NORMAL,ABSENCE DUE TO ILLNESS) | 2.00 |

FIG.12

| CONDITION | RESULT | SUPPORT | CONFIDENCE |
|---|---|---|---|
| (LONG,NEGATIVE FEELING),(LONG,NEGATIVE FEELING) | (NORMAL,ABSENCE DUE TO ILLNESS) | 2.00 | 1.00 |
| (NORMAL,NEGATIVE FEELING) | (NORMAL,USUAL) | 2.00 | 1.25 |

| DATE NAME | 1 | 2 | 3 | 4 |
|---|---|---|---|---|
| G | 6H,WORK ADVANCED. | 4H,MEETING GOT INTO TROUBLE. | 2H,MEETING WAS FINISHED AS SCHEDULED. | 3H,PROBLEM OCCURRED IN SCHEDULE. |

FIG.19

| DATE NAME | 1 | 2 | 3 | 4 |
|---|---|---|---|---|
| G | (LONG,0.50) (VERY LONG,0.50) POSITIVE FEELING | (LONG,1.00) NEGATIVE FEELING | (NORMAL,0.50) (LONG,0.50) USUAL | (NORMAL,0.25) (LONG,0.75) NEGATIVE FEELING |

| DATE / NAME | 5~ | SUPPORT |
|---|---|---|
| G | (NORMAL,ABSENCE DUE TO ILLNESS) | 0.75 |

FIG.20

TIME SERIES PATTERN EXTRACTION APPARATUS AND METHOD

CROSS-REFERENCE TO RELATED APPLICATIONS

This application is based upon and claims the benefit of priority from the prior Japanese Patent Application P2003-078475, filed on Mar. 20, 2003; the entire contents of which are incorporated herein by reference.

FIELD OF THE INVENTION

The present invention relates to a time series pattern extraction apparatus and a method for extracting a pattern usable to find a time series rule from numeric data and text data stored with passage of time.

BACKGROUND OF THE INVENTION

In the GSP (Generalized Sequential Patterns) algorithm of the following document, time series data composed of many discrete elements are input and a frequent pattern is extracted from a set of the time series data.

"Mining Sequential Patterns: Generalization and Performance Improvements", (R. Strikant and R. Agrawal, Proceedings of the 5th International Conference Extending Database Technology, 3–17, 1996.)

However, in this document, each element composing the time series data is limited to discrete data. Accordingly, in this algorithm, general text data and general numeric data can not be processed, and these data can not be unitedly processed. Furthermore, even if a frequent time series pattern is extracted, a rule included in the frequent time series pattern can not be extracted and a future event can not be predicted using the rule.

Next, in Japanese Patent Disclosure (Kokai) P2001-175735, past time series data are input; a feature quantity is extracted from the past time series data; and a regression tree is created from the feature quantity. Furthermore, by applying a feature quantity extracted from current time series data to the regression tree, a prediction value in the future event can be calculated. However, in this method, only numeric time series data is processed as an object. Accordingly, text time series data can not be processed, and a combination of the numeric data and the text data can not be unitedly processed.

Next, in Japanese Patent Disclosure (Kokai) PH6-96052, as for a plurality of time series data, a classification class is determined from one time series data and a discrete or a numeric feature quantity is determined from other time series data. By referring to the classification class and the future quantity, a future classification class can be predicted. However, in this method, a combination pattern of the discrete feature quantity and the numeric feature quantity can not be processed. Briefly, the feature quantity of one side can be only processed.

Next, in Japanese Patent Disclosure (Kokai) PH8-85949, by utilizing a heading of news as one kind of text data and numeric time series data, a regulation direction of the numeric time series data can be predicted. However, the text data is limited to news and a prediction object is limited to the direction of change of the time series data. Accordingly, if the text data and the numeric data are supplied in time series, a problem utilizing a combination of the text data and the numeric data can not be processed.

Accordingly, in the prior art, as for time series data including both the numeric data and the text data as an information element, a frequent time series pattern can not be extracted.

SUMMARY OF THE INVENTION

The present invention is directing to a time series pattern extraction apparatus and a method able to extract a frequent time series pattern from time series data of which information element is numeric data and text data.

According to an aspect of the present invention, there is provided an apparatus for extracting a time series pattern, comprising: a data storage unit configured to store a first time series data including a plurality of element sets, each element set including numeric data and text data; a numeric key concept extraction unit configured to extract a numeric key concept of the numeric data from each element set of the first time series data; a text key concept extraction unit configured to extract a text key concept of the text data from each element set of the first time series data; a generation unit configured to generate a second time series data including a plurality of element sets, each element set including the numeric key concept and the text key concept; a calculation unit configured to calculate a support of at least one combination of each numeric key concept and each text key concept from the plurality of element sets of the second time series data, the support being a degree belonging to the numeric key concept or the text key concept; and a time series pattern extraction unit configured to extract a frequent time series pattern from the second time series data by referring to the support, the frequent time series pattern being at least one combination of each numeric key concept and each text key concept.

According to another aspect of the present invention, there is also provided a method for extracting a time series pattern, comprising: storing a first time series data including a plurality of element sets, each element set including numeric data and text data; extracting a numeric key concept of the numeric data from each element set of the first time series data; extracting a text key concept of the text data from each element set of the first time series data; generating a second time series data including a plurality of element sets, each element set including the numeric key concept and the text key concept; calculating a support of at least one combination of each numeric key concept and each text key concept from the plurality of element sets of the second time series data, the support being a degree belonging to the numeric key concept or the text key concept; and extracting a frequent time series pattern from the second time series data by referring to the support, the frequent time series pattern being at least one combination of each numeric key concept and each text key concept.

According to still another aspect of the present invention, there is also provided a computer program product, comprising: a computer readable program code embodied in said product for causing a computer to extract a time series pattern, said computer readable program code comprising: a first program code to store a first time series data including a plurality of element sets, each element set including numeric data and text data; a second program code to extract a numeric key concept of the numeric data from each element set of the first time series data; a third program code to extract a text key concept of the text data from each element set of the first time series data; a fourth program code to generate a second time series data including a plurality of element sets, each element set including the numeric key concept and the text key concept; a fifth program code to calculate a support of at least one combination of each numeric key concept and each text key concept from the plurality of element sets of the second time series data, the support being a degree belonging to the numeric key concept or the text key concept; and a sixth program code to extract a frequent time series pattern from the second time series data by referring to the support, the frequent time series pattern being at least one combination of each numeric key concept and each text key concept.

BRIEF DESCRIPTION OF THE DRAWINGS

FIG. 2 is a schematic diagram of one example of original data stored in a data storage unit 1 in FIG. 1.

FIG. 6 is a schematic diagram of one example of a second time series data.

FIG. 7 is a schematic diagram of a support degree calculated for a time series pattern "(normal, usual)".

FIG. 8 is a schematic diagram of one example of an extraction result of time series pattern of length "1".

FIG. 9 is a schematic diagram of a support calculated for a time series pattern "(long, negative feeling), (normal, absence due to illness)".

FIG. 10 is a schematic diagram of one example of an extraction result of time series pattern of length "2".

FIG. 11 is a schematic diagram of one example of an extraction result of time series pattern of length "3".

FIG. 12 is a schematic diagram of one example of frequent time series pattern extracted.

FIG. 15 is a schematic diagram of one example of the decision rule extracted.

FIG. 18 is a schematic diagram of one example of the first time series pattern.

FIG. 19 is a schematic diagram of one example of the second time series pattern corresponding to the first time series pattern in FIG. 18.

FIG. 20 is a schematic diagram of one example of the estimation result for the second time series pattern in FIG. 19.

DETAILED DESCRIPTION OF THE EMBODIMENTS

Figure 1:
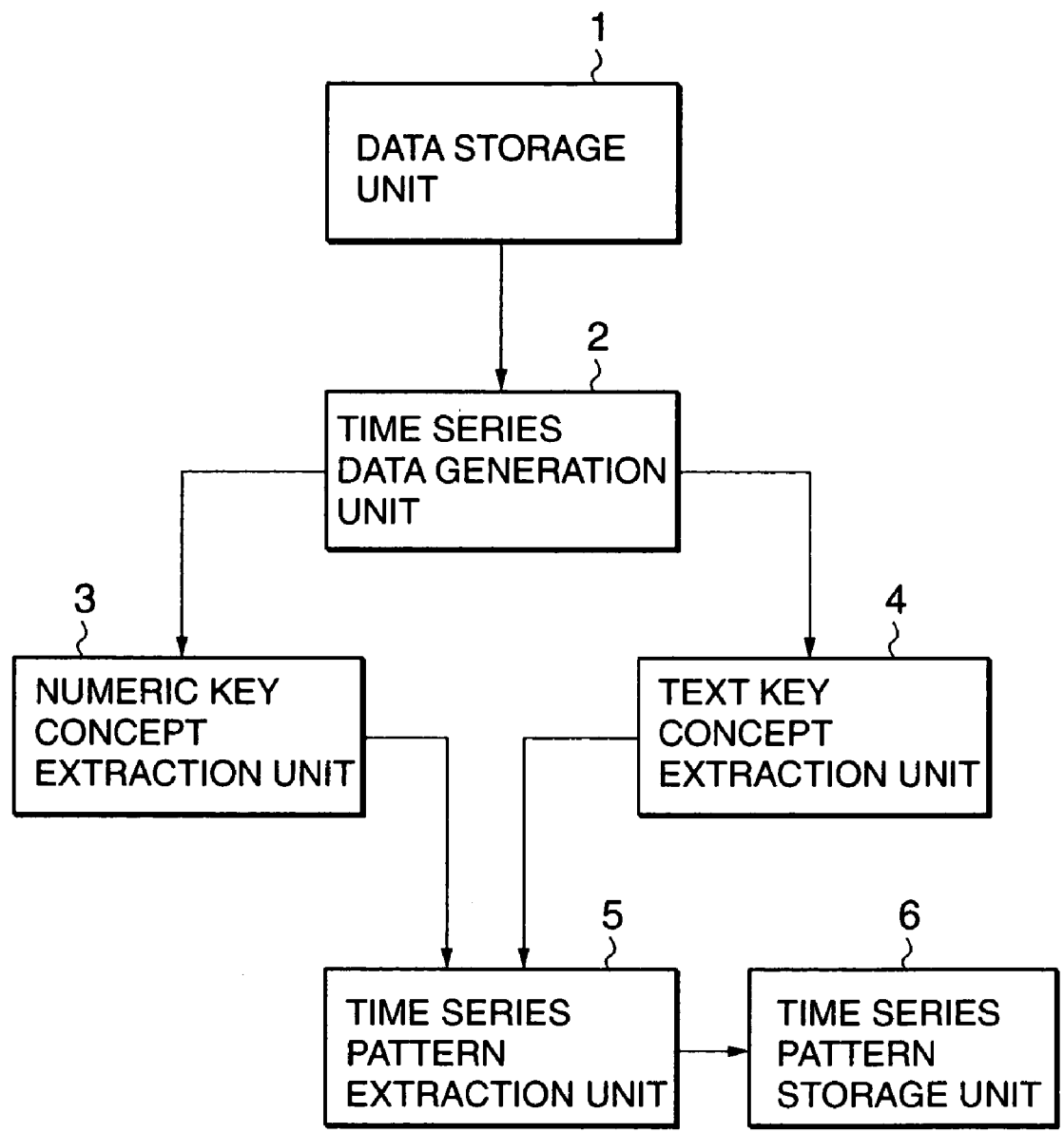
FIG. 1 is a block diagram of a time series pattern extraction apparatus according to a first embodiment of the present invention.

Hereinafter, various embodiments of the present invention will be explained by referring to the drawings.

(The First Embodiment)

FIG. 1 is a block diagram of the time series pattern extraction apparatus according to the first embodiment of the present invention. As shown in FIG. 1, the time series pattern extraction apparatus includes a data storage unit 1, a time series data generation unit 2, a numeric key concept extraction unit 3, a text key concept extraction unit 4, a time series pattern extraction unit 5, and a time series pattern storage unit 6.

As used herein, those skilled in the art will understand that the term "unit" is broadly defined as a processing device (such as a server, a computer, a microprocessor, a microcontroller, a specifically programmed logic circuit, an application specific integrated circuit, a discrete circuit, etc.) that provides the described communication and the functional desired communication. While such a hardware-based implementation is clearly described and contemplated, those skilled in the art will quickly recognize that a "unit" may alternatively be implemented as a software module that works in combination with such a processing device.

Depending on the implementation constraints, a software module or a processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

The data storage unit 1 stores original data as a processing object. FIG. 2 is a schematic diagram of one example of the original data stored in the data storage unit 1.

In FIG. 2, a vertical direction represents each identifier (In this case, the name of a person) and a horizontal direction represents each time (In this case, a date). This original data is comprised of many element sets in which "an overtime work" and "a comment" of some person in one day are included as each information element. Concretely, as an element set of a person of the name "A" in the date "1", the overtime work is "6H" and the comment is that "work advanced in good condition". Briefly, content of the overtime work is represented as a numeric and contents of the comment is represented as a text.

The time series data generation unit 2 creates a first time series data (the original data) of each identifier in time order. Concretely, the first time series data represents arrangement data of element sets of each person in order of date.

The numeric key concept extraction unit 3 extracts a key concept corresponding to an information element of a numeric included in the first time series data. In this example, the key concept corresponding to the numeric representing the overtime work is extracted.

The text key concept extraction unit 4 extracts a key concept corresponding to an information element of a text included in the first time series data. In this example, the key concept corresponding to the text representing the comment is extracted.

The time series pattern extraction unit 5 replaces each information element of the first time series data with the key concept extracted by the numeric key concept extraction unit 3 or the text key concept extraction unit 4, and generates a second time series data as the replacement result. The time series pattern extraction unit 5 extracts a pattern (Hereinafter, it is called a time series pattern) of each key concept included in the second time series data. This time series pattern includes an arrangement pattern of a plurality of key concepts included in the element set of the same time. Furthermore, the time series pattern extraction unit 5 respectively calculates a support of each time series pattern in the second time series data, and a frequent time series pattern from all time series patterns by referring to the support. The support represents a degree belonging to each key concept.

The time series pattern storage unit 6 stores the time series pattern extracted as the frequent time series pattern and the support of the time series pattern.

Figure 3:
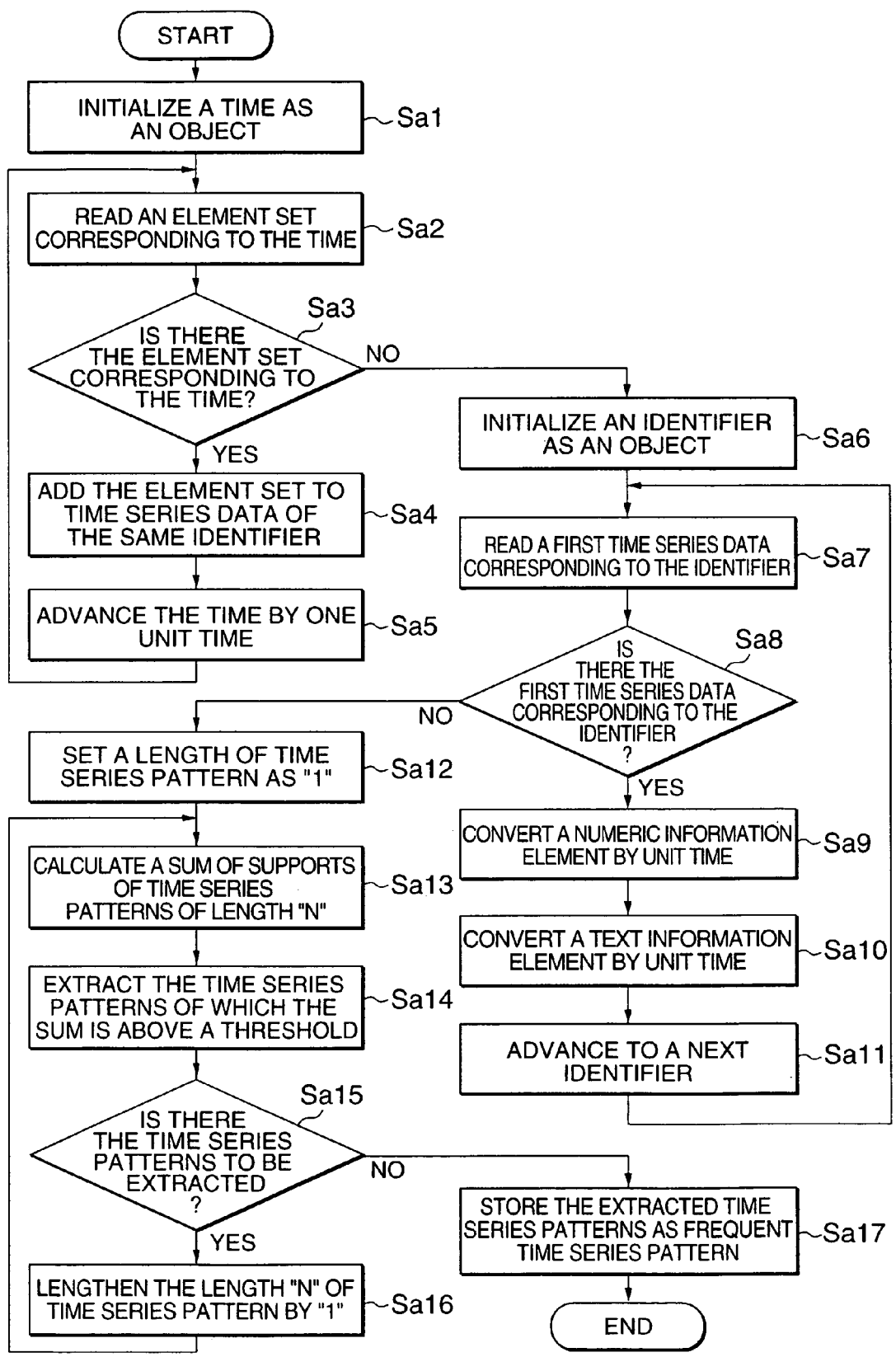
FIG. 3 is a flow chart of extraction processing of a time series pattern according to the first embodiment of the present invention.

Next, operation of the time series pattern extraction unit 5 of the first embodiment is explained. FIG. 3 is a flow chart of extraction processing of the time series pattern according to the first embodiment. At step Sa1, the time series data generation unit 2 initializes an object time to generate the first time series data. In the case of the original data shown in FIG. 2, the start time is "1". Accordingly, the time series data generation unit 2 sets the object time as "1".

At step Sa2, the time series data generation unit 2 reads the element set of each identifier corresponding to the object time from the data storage unit 1. In this case, the object time is "1". Accordingly, the time series data generation unit 2 reads each element set of the second column (date "1") in FIG. 2 from the data storage unit 1.

At step Sa3, the time series data generation unit 2 decides whether the element set corresponding to the object time was read. In the case of the object time "1~5", the element set corresponding to this object time is stored in the data storage unit 1. Accordingly, the time series data generation unit 2 can read the element set at step Sa2. In this case, the processing is forwarded from step Sa3 to step Sa4.

At step Sa4, the time series data generation unit 2 decides the identifier of each element set read at step Sa2, and adds the element set to a series of the same identifier. In this example, in the case of the object time "1" in FIG. 2, the element set "6H, work advanced in good condition." is added to the series of name "A". The element set "2H, work advanced as scheduled." is added to the series of name "B".

At step Sa5, the time series data generation unit 2 advances the object time by one unit time. Accordingly, the object time increases in order as "2", "3", "4", "5", "6". Then, the processing is returned to step Sa2. By repeating a loop from step Sa2 to step Sa5, the first time series data of each identifier is generated. In FIG. 2, if the name is utilized as the identifier, the first time series data of each name "A"~"F" are generated. Furthermore, the object time is "1"~"5". Accordingly, a length of the first time series data of each identifier is "5". The first time series data of the name "A" is "6H, work advanced in good condition.", "4H, work got into trouble.", "2H, work was finished as scheduled.", "2H, meeting was finished without problem.", "0H, I take a refresh vacation.". After the object time is set as "6" at step Sa5, in the execution of step Sa2, corresponding element set does not exist and the time series data generation unit 2 can not read the element set. Accordingly, the processing is forwarded from step Sa3 to step Sa6.

At step Sa6, as preparation for the numeric key concept extraction unit 3 and the text key concept extraction unit 4 to generate the second time series data, an object identifier is initialized. In FIG. 2, the first identifier is "A". Accordingly, "A" is set as the object identifier.

At step Sa7, the numeric key concept extraction unit 3 and the text key concept extraction unit 4 extract the first time series data corresponding to the object identifier from the time series data generation unit 2. In the execution of step Sa7 after step Sa6 is processed, the object identifier is "A". Accordingly, the numeric key concept extraction unit 3 and the text key concept extraction unit 4 obtain the above-mentioned first time series data of the name "A".

At step Sa8, the numeric key concept extraction unit 3 and the text key concept extraction unit 4 decide whether first time series data corresponding to the object identifier exists. Concretely, the first time series data corresponding to each identifier "A"~"F" are already generated. Accordingly, if the object identifier is "A"~"F", the numeric key concept extraction unit 3 and the text key concept extraction unit 4 can extract the first time series data at step Sa7. Accordingly, in this case, the processing is forwarded to step Sa9.

Figure 4:
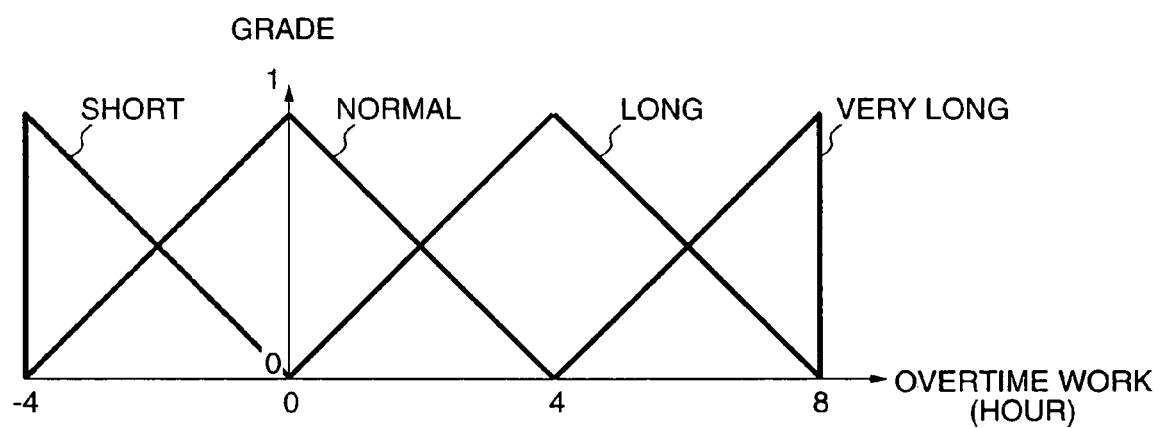
FIG. 4 is a schematic diagram of one example of a fuzzy set used for extracting a key concept by a numeric key concept extraction unit 3 in FIG. 1.

At step Sa9, the numeric key concept extraction unit 3 extracts a key concept corresponding to a numeric from each information element included in the first time series data. In this example, the numeric key concept extraction unit 3 extracts the key concept corresponding to "overtime work" of information element included in each element set of the first time series data. In order for the numeric key concept extraction unit 3 to extract the key concept, a fuzzy set defined by the membership function as shown in FIG. 4 is utilized. In this case, the numeric key concept extraction unit 3 extracts a key concept as a pair of a fuzzy set name and a grade. The grade is a belonging degree that the overtime work represents a tendency of the fuzzy set name. In this example, as for the information element "6H", the numeric key concept extraction unit 3 extracts the key concept "(long, 0.50), (very long, 0.50)". In this way, when the key concept is extracted, the time series pattern extraction unit 5 adds the key concept to the series of the object identifier.

Figure 5:
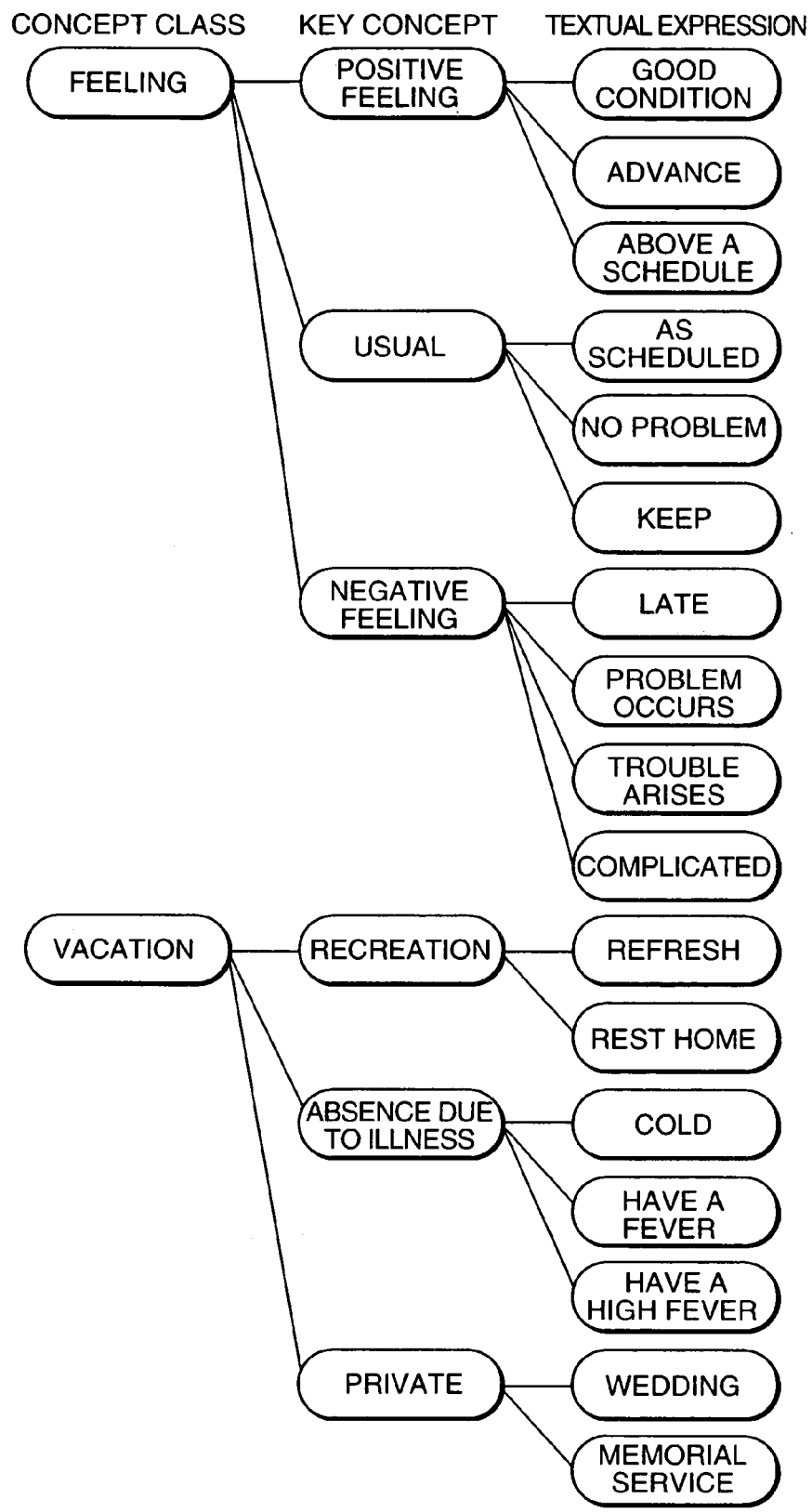
FIG. 5 is a schematic diagram of one example of a key concept dictionary used for extracting a key concept by a text key concept extraction unit 4 in FIG. 1.

At step Sa10, the text key concept extraction unit 4 extracts a key concept corresponding to a text from each information element included in the first time series data. In this example, the text key concept extraction unit 4 extracts the key concept corresponding to "comment" of information element included in each element set of the first time series data. In order for the text key concept extraction unit 4 to extract the key concept, a key concept dictionary of three hierarchies as shown in FIG. 5 is utilized. In this case, the text key concept extraction unit 4 decides whether the text includes a textual expression of the key concept dictionary, and extracts a key concept corresponding to the textual expression as a key concept of the text if the text includes the textual expression. In the case of the text "work advanced in good condition.", the text includes a textual expression "good condition" described in the key concept dictionary. Accordingly, the text key concept extraction unit 4 extracts a key concept "positive feeling". In this way, when the key concept is extracted, the time series pattern extraction unit 5 adds the key concept to the series of the object identifier.

At step Sa11, the numeric key concept extraction unit 3 and the text key concept extraction unit 4 advance the object identifier to a next identifier. Accordingly, the object identifier changes in order as "B", "C", "D", "E", "F", "G". Then, the processing is returned to step Sa7.

By repeating a loop from step Sa7 to step Sa11, a second time series data of each identifier is generated. This second time series data represents the first time series data of the same identifier in which each information element is replaced by the key concept. FIG. 6 is a schematic diagram of one example of contents of the second time series data. In FIG. 6, the second time series data of the identifier "A"

includes "(long, 0.50), (very long, 0.50), positive feeling", "(long, 1.00), positive feeling", "(normal, 0.50), (long, 0.50), usual", "(normal, 0.50), (long, 0.50), usual", "(normal, 1.00), recreation".

In execution of step Sa8 after the object identifier is changed to "G" at step Sa11, corresponding first time series data does not exist. Accordingly, the numeric key concept extraction unit 3 and the time series pattern extraction unit 5 can not extract the first time series data. In this case, the processing is forwarded from step Sa8 to step Sa12.

At step Sa12, as preparation to extract the time series pattern, the time series pattern extraction unit 5 sets a length of time series pattern as "1".

At step Sa13, the time series pattern extraction unit 5 calculates a sum of support of each time series pattern of length "N". In this case, the time series pattern represents a pattern of length "N" as a basis of combination of each key concept without the grade. Concretely, as the key concept corresponding to the overtime work, "short", "normal", "long" and "very long" exist. As the key concept corresponding to the comment, "positive feeling.", "usual", "negative feeling", "recreation", "absence due to illness" and "private" exist. A combination pattern of these key concepts is set as a basic pattern. For example, "long, positive feeling" is used as the basic pattern. An arrangement pattern of N (N: integral number above "1") units of the basic pattern is the time series pattern.

First, the time series pattern extraction unit 5 selects one of all time series patterns of length "N" as an object pattern. Then, the time series pattern extraction unit 5 decides whether the object pattern is included in each second time series data. If the object pattern is not included, a support of the object pattern is "0.00". If the object pattern is included, a minimum of the support of each element matched with the object pattern in the second time series data is selected, and the minimum is set as a support degree of the object pattern for the second time series data. In this case, if a plurality of the same object pattern is included in the second time series data of each identifier, a maximum of the support of each of the plurality of the same object pattern is selected as a support of the same object pattern for the second time series data. Concretely, if the object pattern is "(normal, usual)", the second time series data of the identifier "A" includes this object pattern as the element set of times "3" and "4". In each element set of times "3" and "4", a grade of "normal" is "0.50". Accordingly, a support degree of the object pattern "(normal, usual)" for the identifier "A" is calculated as "max (min(0.50), min(0.50))". In calculation of the support degree, a grade of "usual" is taken into consideration. However, the key concept of the text does not include the grade. Accordingly, the grade of the key concept of the text is regarded as "1.00". Briefly, in the case of calculating the support, the grade of the key concept of the text can be neglected. In this way, the support of the object pattern "(normal, usual)" for each identifier is calculated as shown in FIG. 7. Next, the time series pattern extraction unit 5 calculates a sum of the support of each identifier and sets the sum as the support of the object pattern. As for the object pattern "(normal, usual)" shown in FIG. 7, the support of each identifier is "0.50", "0.50", "1.00", "1.00", "0.50" and "1.00". Accordingly, the support of the object pattern is "4.50".

At step Sa14, the time series pattern extraction unit 5 extracts the time series pattern (object pattern) of length N of which the support is above a threshold. For example, if the threshold is "2.00" and the length N is "1", time series patterns are extracted as shown in FIG. 8

At step Sa15, the time series pattern extraction unit 5 decides whether the time series pattern is extracted at step Sa14. If the time series pattern is extracted, the processing is forwarded to step Sa16.

At step Sa16, the time series pattern extraction unit 5 lengthens the length N by "1". Accordingly, the length N is lengthened as "2", "3", "4" and "5". After that, the processing is forwarded to step Sa13. By repeating a loop from step Sa13 to step Sa16, the support is calculated for each time series pattern (object pattern) having various length. Last, the time series pattern of which support is above the threshold is extracted.

For example, assume that the object pattern as the time series pattern of length "2" is "(long, negative feeling), (normal, absence due to illness)". As for the identifier "E" in FIG. 6, each combination of two element sets of times "1" and "4", "1" and "5", "2" and "4", "2" and "5", coincides with the object pattern. Accordingly, the support of this object pattern for the identifier "E" is calculated as "max (min(1.00, 1.00); min(1.00, 1.00), min(0.50, 1.00), min (0.50, 1.00))". In this way, the support of this object pattern for each identifier is calculated as shown in FIG. 9. Last, the support of this object pattern is "2.75" as the sum of the support of each identifier. This sum of the support is above the threshold "2.00". Accordingly, the time series pattern "(long, negative feeling), (normal, absence due to illness)" is extracted at step Sa14. As a result, in the case that the length N is "2" for the second time series data in FIG. 6, five time series pattern of length "2" are extracted as shown in FIG. 10. In the case that the length N is "3" for the second time series data in FIG. 6, one time series pattern of length "3" is extracted as shown in FIG. 11

As for the second time series pattern shown in FIG. 6, in the case that the length N is "4", a time series pattern having a support above "2.00" does not exist. Accordingly, in execution of step Sa14 for the length "41", the time series pattern extraction unit 5 can not extract any time series pattern. In this way, when the time series pattern is not extracted, the processing is forwarded from step Sa15 to step Sa17. In the second time series data shown in FIG. 6, times "1"~"5" exist and the time series pattern of the longest length "5" can exist. However, the time series pattern of length "5" includes the time series pattern of length "4" and the support of the time series pattern of length "5" is not above the support of the time series pattern of length "4". Accordingly, if any time series pattern is not extracted at step Sa14, repeat processing of the loop from step Sa13 to step Sa16 is useless, and the repeat processing is completed.

At step Sa17, the time series pattern extraction unit 5 stores all time series patterns extracted at step Sa14 as a frequent time series pattern in the time series pattern storage unit 7. As for the second time series data in FIG. 6, the frequent time series patterns of length "1", "2" and "3" are stored in the time series pattern storage unit 7 as shown in FIG. 12.

As mentioned-above, in the time series pattern extraction apparatus of the first embodiment, each information element included in the first time series data is replaced with the key concept. Concretely, a numeric of the information element is replaced with the key concept under a condition of the numeric and a text of the information element is replaced with the key concept under a condition of the text. As a frequent one in the time series pattern composed by key concepts, a feature pattern included in the first time series data is extracted. Accordingly, even if the first time series data includes both the numeric data and the text data, a frequent feature pattern can be properly extracted. By referring to the frequent feature pattern, a rule inherent in the first time series data can be decided. Furthermore, the numeric data and the text data can be unitedly processed. Accordingly, analysis area of object data can be extended and the analysis can be accurately executed.

(The Second Embodiment)

Figure 13:
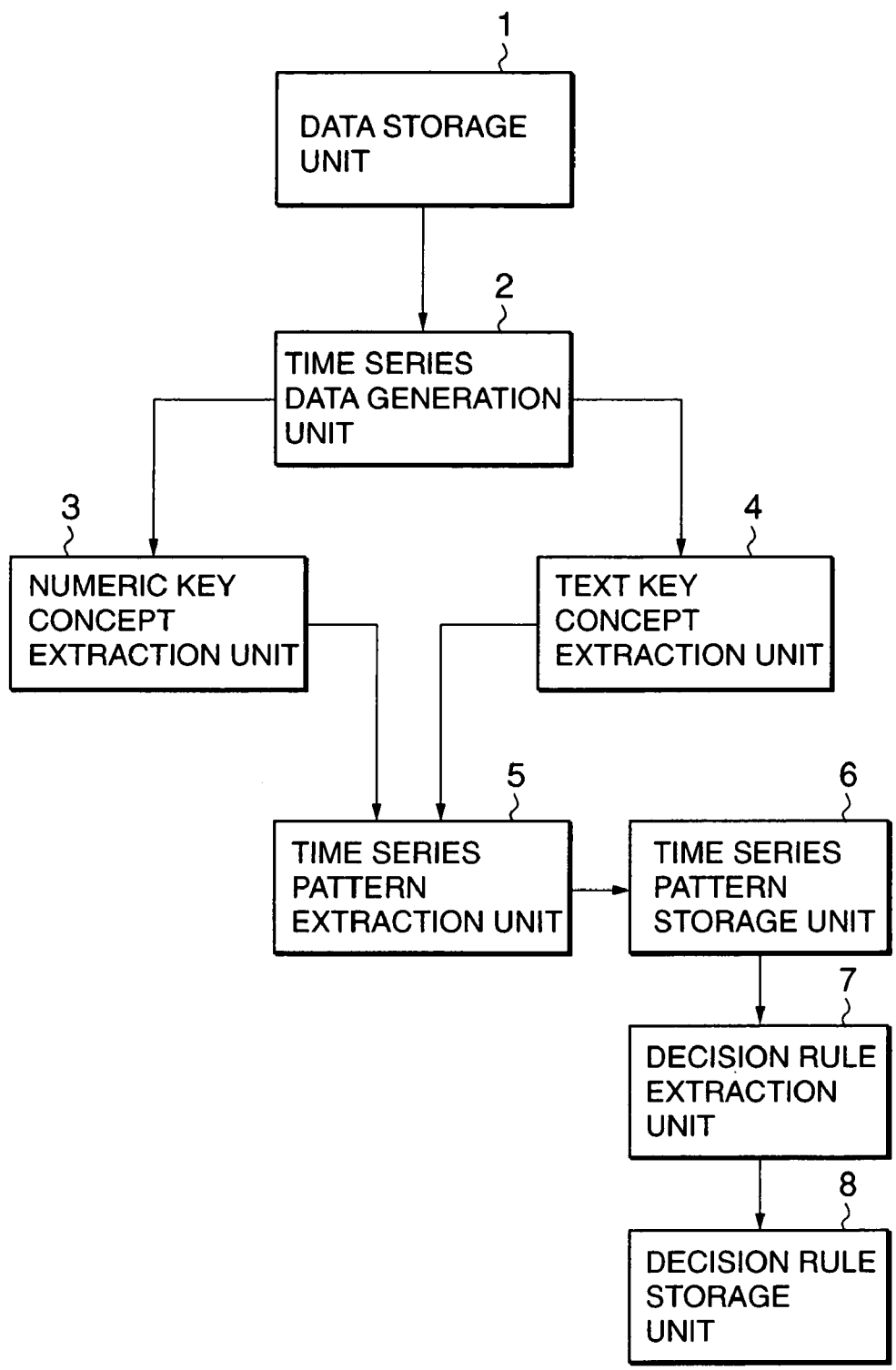
FIG. 13 is a block diagram of the time series pattern extraction apparatus according to a second embodiment of the present invention.

FIG. 13 is a block diagram of the time series pattern extraction apparatus according to the second embodiment of the present invention. As for the same unit as FIG. 1 in FIG. 13, the same reference is used and the detail explanation is omitted. As shown in FIG. 13, the time series pattern extraction apparatus of the second embodiment includes the data storage unit 1, the time series data generation unit 2, the numeric key concept extraction unit 3, the text key concept extraction unit 4, the time series pattern extraction unit 5, the time series pattern storage unit 6, a decision rule extraction unit 7, and a decision rule storage unit 8. Briefly, the time series pattern extraction apparatus of the second embodiment includes the decision rule extraction unit 7 and the decision rule storage unit 8 in addition to components of the first embodiment.

The decision rule extraction unit 7 extracts a decision rule to predict a future pattern in the first time series data by referring to the frequent time series pattern stored in the time series pattern storage unit 6. The decision rule storage unit 8 stores the decision rule extracted by the decision rule extraction unit 7.

Next, operation of the time series pattern extraction apparatus of the second embodiment is explained. The extraction processing of the time series pattern is executed in the same way as in the first embodiment. The operation of the second embodiment different from the first embodiment is an extraction processing of the decision rule by the decision rule extraction unit 7. Accordingly, hereinafter, the extraction processing of the decision rule is mainly explained.

Figure 14:
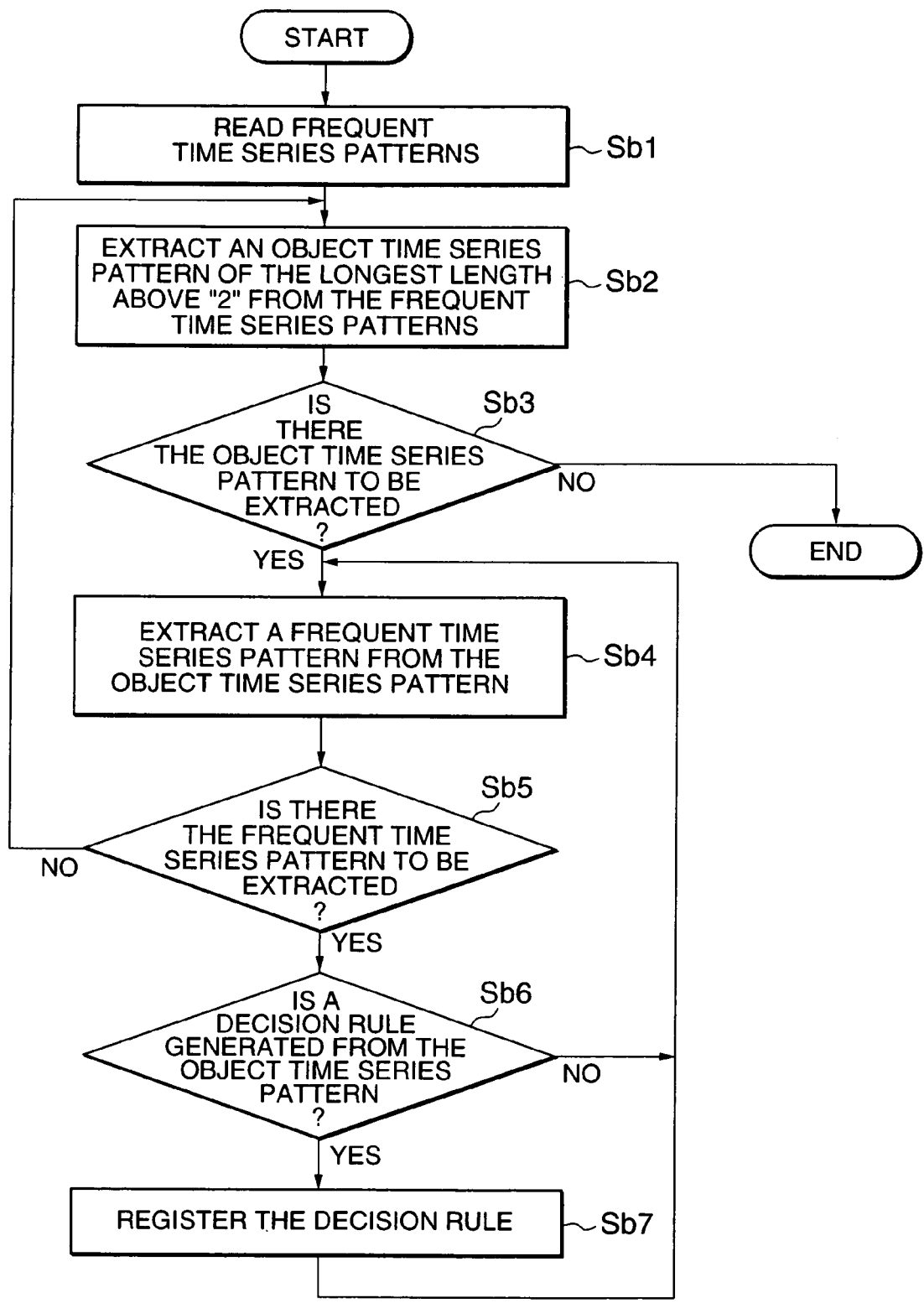
FIG. 14 is a flow chart of extraction processing of a decision rule according to the second embodiment of the present invention.

FIG. 14 is a flow chart of the extraction processing of the decision rule.

At step Sb1, the decision rule extraction unit 7 reads the frequent time series patterns from the time series pattern storage unit 6. For example, if the frequent time series pattern generated from the example of the first embodiment is the object, the frequent time series pattern shown in FIG. 12 is read.

At step Sb2, the decision rule extraction unit 7 extracts one time series pattern of the longest length above "2" from the frequent time series patterns read. In FIG. 12, at the first execution of step Sb2, the decision rule extraction unit 7 extracts the time series pattern of length "3" as an object time series pattern.

At step Sb3, the decision rule extraction unit 7 decides whether the time series pattern is extracted at step Sb2. If the time series pattern is already extracted, the processing is forwarded to step Sb4.

At step Sb4, the decision rule extraction unit 7 extracts one time series pattern as a part of the object time series pattern under a condition that the one time series pattern is included in the frequent time series patterns and is not located at the end of the object time series pattern. For example, if the object time series pattern is "(long, negative feeling), (long, negative feeling), (normal, absence due to illness)", the frequent time series pattern as a part of the object time series pattern is "(long, negative feeling)", "(normal, absence due to illness)", "(long, negative feeling), (long, negative feeling)", "(long, negative feeling), (normal, absence due to illness)". However, "(normal, absence due to illness)" and "(long, negative feeling), (normal, absence due to illness)" includes the end pattern of the object time series pattern. Accordingly, "(long, negative feeling)" and "(long, negative feeling), (long, negative feeling)" are set as a candidate to be extracted at step Sb4.

At step Sb5, the decision rule extraction unit 7 decides whether the frequent time series pattern is extracted from the object time series pattern at step Sb4. If the frequent time series pattern is already extracted, the processing is forwarded to step Sb6.

At step Sb6, the decision rule extraction unit 7 decides whether a rule can be generated from the object time series pattern. This decision is executed as follows. Assume that a support of the object time series pattern is X and a support of the frequent time series pattern (extracted at step Sb4) is Y. In this case, a confidence is calculated by the following equation (1).

$$\text{Confidence} = X/Y \qquad (1)$$

The decision rule extraction unit 7 decides whether the confidence is above a threshold. If the confidence is above the threshold, the rule can be generated from the object time series pattern. For example, assume that the object time series pattern is "(long, negative feeling), (long, negative feeling), (normal, absence due to illness)" and the frequent time series pattern (extracted at step Sb4) is "(long, negative feeling), (long, negative feeling)". In FIG. 12, X is "2.00" and Y is "2.00". In this case, the confidence is "1.00". If the threshold is "0.80", the confidence is above the threshold. Accordingly, it is decided that a rule can be generated from the object time series pattern "(long, negative feeling), (long, negative feeling), (normal, absence due to illness)". In this way, if it is decided that the rule can be generated from the object time series pattern, the processing is forwarded to step Sb7.

At step Sb7, the decision rule extraction unit 7 creates a decision rule from the object time series pattern. As the decision rule, the frequent time series pattern (extracted at step Sb4) is a condition part and the object time series pattern excluding the frequent time series pattern (extracted at step Sb4) is a conclusion part (a result). This decision rule is stored in the decision rule storage unit 8. In the above-mentioned example, a decision rule of which condition part is "(long, negative feeling), (long, negative feeling)" and conclusion part is "(normal, absence due to illness)" is generated. In the case of storing the decision rule in the decision rule storage unit 8, the support of the object time series pattern and the confidence (calculated at step Sb6) are stored in correspondence with the decision rule. In this way, as for the frequent time series patterns in FIG. 12, two decision rules are registered as shown in FIG. 15.

In the case that registration of the decision rule is completed or that a rule can not be generated from the object time series data at step Sb6, the processing is sent back to step Sb4. Then, the decision rule extraction unit 7 repeatedly executes a loop from step Sb4 to step Sb7.

In the execution of step Sb4 except for the first time, the decision rule extraction unit 7 excludes the extracted frequent time series pattern from a selection candidate. In the above-mentioned example, as for two candidates "(long, negative feeling)" and "(long, negative feeling), (long, negative feeling)", one candidate "(long, negative feeling), (long, negative feeling)" was already extracted. Accordingly, in the execution of step Sb4 at the second time, the decision rule extraction unit 7 extracts the other candidate "(long, negative feeling)". In the execution of step Sb4 at the third time, the frequent time series pattern to be extracted does not exist. In this case, the processing is returned from step Sb5 to step Sb2.

In the execution of step Sb2 except for the first time, the decision rule extraction unit 7 excludes the time series pattern extracted in the past execution of step Sb2. Concretely, in the above-mentioned example, "(long, negative feeling), (long, negative feeling), (normal, absence due to illness)" was already extracted from frequent time series patterns of FIG. 12 in the execution of step Sb2 at the first time. Accordingly, in the execution of step Sb2 at the second time, the decision rule extraction unit 7 extracts one time series pattern of the longest length above 2 from the frequent time series patterns of FIG. 12 except for "(long, negative feeling), (long, negative feeling), (normal, absence due to illness)". Briefly, in the execution of step Sb2 from the second time, the decision rule extraction unit 7 selects the object time series pattern from the time series pattern of length "2". In the execution of step Sb2 after all time series patterns of length "2" are selected, only frequent time series patterns of length "1" exist. Accordingly, the decision rule extraction unit 7 can not extract the frequent time series pattern of length N above "2". Briefly, if the frequent time series pattern to be extracted does not exist, the decision rule extraction unit 7 completes the extraction processing of decision rule.

As mentioned-above, in the second embodiment; based on a frequent time series pattern included in the first time series data, a decision rule representing a future pattern which may occur following some pattern is generated. Accordingly, by using the decision rule, the future pattern can be predicted by the decision rule inherent to the first time series data.

(The Third Embodiment)

Figure 16:
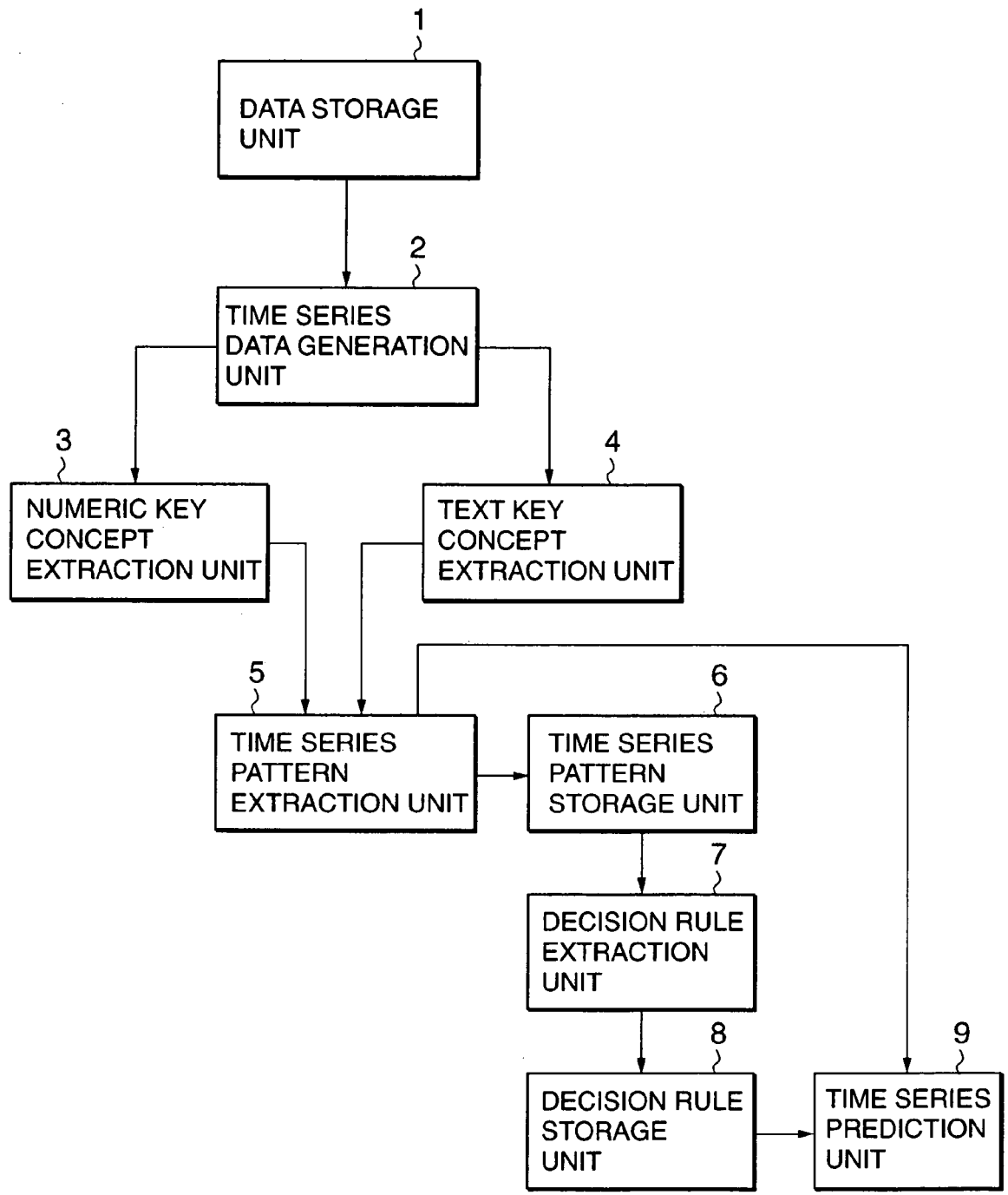
FIG. 16 is a block diagram of the time pattern extraction apparatus according to a third embodiment of the present invention.

FIG. 16 is a block diagram of the time series pattern extraction apparatus according to the third embodiment of the present invention. As for the same unit of FIG. 16 as FIGS. 1 and 13, the same reference is used and the detail explanation is omitted. As shown in FIG. 16, the time series pattern extraction apparatus of the third embodiment includes the data storage unit 1, the time series data generation unit 2, the numeric key concept extraction unit 3, the text key concept extraction unit 4, the time series pattern extraction unit 5, the time series pattern storage unit 6, the decision rule extraction unit 7, the decision rule storage unit 8, and a time series prediction unit 9. Briefly, the time series pattern extraction apparatus of the third embodiment includes the time series prediction unit 9 in addition to components of the second embodiment. The time series prediction unit 9 predicts the future pattern which may occur in the first time series data by using the second time series data (obtained by the time series pattern extraction unit 5) and the decision rule (stored in the decision rule storage unit 8).

Next, operation of the time series pattern extraction apparatus of the third embodiment is explained. The extraction processing of time series pattern is executed in the same way as the first embodiment. The extraction processing of the decision rule is executed in the same way as in the second embodiment. The processing of the third embodiment different from the first and second embodiments is a prediction processing of the time series prediction unit 9. Hereinafter, the prediction processing is mainly explained.

Figure 17:
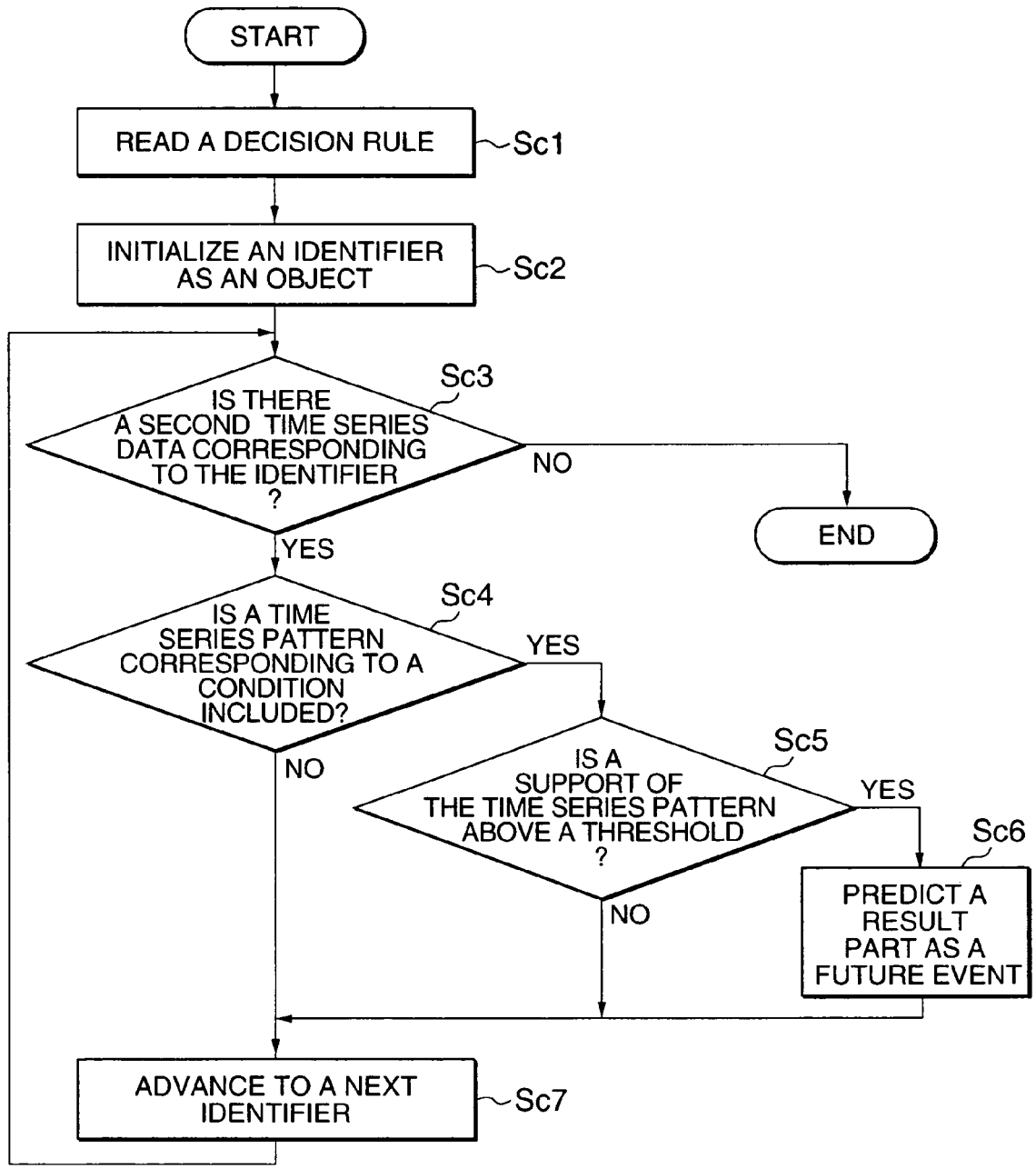
FIG. 17 is a flow chart of prediction processing of a future event according to the third embodiment of the present invention.

FIG. 17 is a flow chart of the prediction processing of the third embodiment. In the prediction processing, a future pattern occurrable in the first time series data is predicted. The time series prediction unit 9 executes this prediction processing based on the second time series data corresponding to the first time series data of the object identifier. Accordingly, in the case of predicting the future pattern in the first time series data of which the second time series data is not created, the time series pattern extraction unit 5 creates the second time series data corresponding to the first time series data. For example, in the case of predicting the future pattern (element set) in the first time series data shown in FIG. 18, the time series pattern extraction unit previously creates the second time series data shown in FIG. 19 from the first time series data.

At step Sc1, the time series prediction unit 9 reads a decision rule from the decision rule storage unit 8. For example, the decision rule shown in FIG. 15 is read.

At step Sc2, as preparation to sequentially read the second time series data as a prediction object, the time series prediction unit 9 initialize an object identifier. For example, as for the second time series data of FIG. 19 as the prediction object, the object identifier is initialized by the name "G".

At step Sc3, the time series prediction unit 9 decides whether the second time series data corresponding to the object identifier exists. In the execution of step Sc3 following step Sc2, the object identifier is set as an identifier of the second time series data as the prediction object. Accordingly, the time series prediction unit 9 decides that the second time series data corresponding to the object identifier exists. In this case, the processing is forwarded to step Sc4.

At step Sc4, the time series prediction unit 9 decides whether the second time series data of the object identifier includes a time series pattern of a condition part of the decision rule. Concretely, in the second time series data of the name "G" shown in FIG. 19, "(long, negative feeling)" is included at the dates (times) "2" and "4". Accordingly, the condition part "(long, negative feeling), (long, negative feeling)" of the first decision rule shown in FIG. 15 is included. In this case, the processing is forwarded to step Sc5.

At step Sc5, the time series prediction unit 9 decides whether a support of time series pattern matched with the condition part in the second time series pattern is above a threshold. Concretely, in the second time series data of the name "G" in FIG. 19, grade of "long" at the date "2" is "1.00" and a grade of "long" at the date "4" is "0.75". Accordingly, a support of time series pattern "(long, negative feeling), (long, negative feeling)" is "0.75" as "max (min (1.00, 0.75))". If the threshold is "0.70", the time series prediction unit 9 decides that the support is above the threshold. In this case, the processing is forwarded to step Sc6.

At step Sc6, the time series prediction unit 9 extracts a conclusion part (a result) corresponding to the condition part matched with the time series pattern from the decision rule, and sets the conclusion part as a pattern of future event of the object identifier. In the above-mentioned example, the conclusion part "(normal, absence due to illness)" corresponding to the condition part "(long, negative feeling), (long, negative feeling)" is selected and set as the pattern of the future event. The time series prediction unit 9 outputs this prediction result as shown in FIG. 20. After that, the processing is forwarded to step Sc7.

In the second time series data of the object identifier, if a time series pattern matched with the condition part of the decision rule is not included, the processing is forwarded from step Sc4 to step Sc7. Furthermore, if the support of the time series pattern matched with the condition part is below the threshold, the processing is forwarded from step Sc5 to step Sc7. In these cases, the pattern of the future event of the object identifier is not predicted.

At step Sc7, the time series prediction unit 9 updates (advances) the object identifier to a next identifier. In the above-mentioned example, the object identifier is initially set as the name "G". In this case, the time series prediction unit 9 changes the object identifier as the name "H". After that, the processing is returned to step Sc3.

If a plurality of the second time series data corresponding to a different identifier exist, the time series prediction unit 9 executes the processing from step Sc3 to step Sc7 for the second time series data of each identifier. In FIG. 19, the second time series data of the identifier "G" only exists. Accordingly, in the execution of step Sc3 under a condition of the object identifier "H", the time series prediction unit 9 decides that the second time series data corresponding to this object identifier does not exist. In this case, the time series prediction unit 9 completes the prediction processing.

As mentioned-above, in the third embodiment, the pattern of the future event in the first time series data can be automatically predicted based on the decision rule (generated in the second embodiment).

The present invention is not limited to the first, second and third embodiments. For example, each element set in the first time series data may include at least three information elements. Furthermore, a plurality of information elements in each element set may be one of the numeric data and the text data.

An evaluation value representing an appearance frequency of the time series pattern is not limited to the support calculated in the first embodiment. A value calculated by a different rule may be used instead of the support.

The threshold used at step Sa14 in FIG. 3 may be arbitrarily changed in proportion to a length of the time series pattern.

A method for extracting the key concept may be arbitrarily changed. For example, as the method for extracting the key concept of the text, a method using a key concept dictionary of at least four hierarchies, or a method using a key concept as a lexicon obtained by lexicon analysis of the text, may be used. Furthermore, the grade may be assigned to the key concept of the text.

Based on the decision rule extracted in the third embodiment, a result may be conversely set. In this case, a condition part corresponding to the result in the decision rule can be predicted as progress events to occur the result.

In the present invention, as for the time series data including the numeric and the text as each information element, a frequent time series pattern can be extracted from the time series data by unitedly processing these different information elements.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the storage devices may be combined into one memory, or more than one memory may be used. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through a network. Furthermore, in the present invention, the computer is not limited to a personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for extracting a time series pattern, comprising:

a data storage unit configured to electronically store a first time series data including a plurality of element sets, each element set including numeric data and text data;

a numeric key concept extraction unit configured to extract a numeric key concept of the numeric data from each element set of the first time series data, and assign a grade to the numeric key concept, the grade representing a degree that the numeric data belongs to the numeric key concept;

a text key concept extraction unit configured to extract a text key concept of the text data from each element set of the first time series data;

a generation unit configured to generate a second time series data including a plurality of element sets, each element set including the numeric key concept, the grade, and the text key concept from the respective element set in the first time series data;

a calculation unit configured to calculate a support of a combination of each numeric key concept and each text key concept from the plurality of element sets of the second time series data, the support being based on the grade of each element set including the numeric key concept and the text key concept matched with the combination;

a time series pattern extraction unit configured to extract a frequent time series pattern from the second time series data by referring to the support, the frequent time series pattern being at least one combination of a numeric key concept and a text key concept having the support above a threshold; and a time series pattern storage unit configured to electronically store the frequent time series pattern as an analysis result of the first time series data.

2. The apparatus according to claim 1, wherein said data storage unit stores a plurality of first time series data differently corresponding to an identifier, and wherein each of the plurality of first time series data includes the plurality of element sets differently corresponding to a time order.

3. The apparatus according to claim 2, wherein said numeric key concept extraction unit includes a function of each numeric data and the grade.

4. The apparatus according to claim 3, wherein said numeric key concept extraction unit retrieves the grade corresponding to the numeric data of each element set from the function of each numeric key concept, and replaces the numeric data of each element set with a pair of the numeric key concept and the grade.

5. The apparatus according to claim 4, wherein said text key concept extraction unit includes a key concept dictionary representing a hierarchical relationship between each text key concept and a textual expression.

6. The apparatus according to claim 5, wherein said text key concept extraction unit retrieves the text key concept corresponding to a textual expression included in the text data of each element set from the key concept dictionary, and replaces the text of each element set with the text key concept.

7. The apparatus according to claim 6, wherein said generation unit generates a plurality of second time series data corresponding to the plurality of first time series data, and wherein each of the plurality of second time series data includes the plurality of element sets each substitutionally including the set of the numeric key concept and the grade, and the text key concept.

8. The apparatus according to claim 7, wherein said calculation unit creates a combination of each numeric key concept and each text key concept, retrieves the grade of each element set in which a pair of the numeric key concept and the text key concept coincides with the combination from the second time series data of each identifier, and selects a maximum of the retrieved grades corresponding to each identifier as the support.

9. The apparatus according to claim 8, wherein said calculation unit calculates a sum of the supports of all identifiers, and sets the combination as the frequent time series pattern of one length if the sum is above a threshold.

10. The apparatus according to claim 9, wherein said calculation unit creates a plurality of combinations of each numeric key concept and each text key concept, retrieves grades of a plurality of element sets in which a plurality of pairs of the numeric key concept and the text key concept coincide with the plurality of combinations from the second time series data of each identifier, selects a minimum of the retrieved grades corresponding to each identifier, and selects a maximum of a plurality of minimums corresponding to each identifier as the support if the plurality of minimums corresponding to each identifier are selected.

11. The apparatus according to claim 10, wherein said calculation unit calculates a sum of the supports of all identifiers, and sets the plurality of combinations as the frequent time series pattern of which length is equal to a number of the plurality of combinations if the sum is above a threshold.

12. The apparatus according to claim 11, wherein said time series pattern storage unit correspondingly stores the frequent time series pattern and the sum of supports.

13. The apparatus according to claim 12, further comprising a decision rule extraction unit configured to recursively retrieve a frequent time series pattern of the longest length above two from said time series pattern storage unit, set the frequent time series pattern as an object time series pattern, and extract at least one frequent time series pattern from the object time series pattern excluding a combination of the numeric key concept and the text key concept located in the end of the object time series pattern.

14. The apparatus according to claim 13, wherein said decision rule extraction unit calculates a confidence as a ratio of the sum of supports of the object time series pattern to the sum of supports of the at least one frequent time series pattern, and generates a decision rule including the at least one frequent time series pattern as a condition and the object time series pattern excluding the at least one frequent time series pattern as a result if the confidence is above a threshold.

15. The apparatus according to claim 14, further comprising a decision rule storage unit configured to correspondingly store the decision rule, the sum of support of the object time series pattern, and the confidence.

16. The apparatus according to claim 15, further comprising a time series prediction unit configured to extract the decision rule from said decision rule storage unit, decide whether the condition of the decision rule is included in a second time series data of the identifier as a prediction object, retrieve the grade of each element set matched with the condition from the second time series data, and select a minimum from the retrieved grades.

17. The apparatus according to claim 16, wherein said time series prediction unit selects a maximum from a plurality of minimums if each of the plurality of minimums selected from the retrieved grades of the matched element sets is different.

18. The apparatus according to claim 16, wherein said time series prediction unit sets the result of the decision rule as a prediction element set of the second time series data if the minimum is above a threshold, and correspondingly stores the result and the minimum as a support.

19. A method for extracting a time series pattern, comprising:
  electronically storing a first time series data including a plurality of element sets, each element set including numeric data and text data;
  extracting a numeric key concept of the numeric data from each element set of the first time series data;
  assigning a grade to the numeric key concept, the grade being a degree that the numeric data belongs to the numeric key concept;
  extracting a text key concept of the text data from each element set of the first time series data;
  generating a second time series data including a plurality of element sets, each element set including the numeric key concept, the grade, and the text key concept from the respective element set in the first time series data;
  calculating a support of a combination of each numeric key concept and each text key concept from the plurality of element sets of the second time series data, the support being based on the grade of each element set including the numeric key concept and the text key concept matched with the combination; and
  extracting a frequent time series pattern from the second time series data by referring to the support, the frequent time series pattern being at least one combination of a numeric key concept and a text key concept having the support above a threshold; and
  electronically storing the frequent time series pattern as an analysis result of the first time series data.

20. A computer-readable medium storing program instructions for causing a computer to extract a time series pattern, said program instructions comprising:

a first program code to electronically store a first time series data including a plurality of element sets, each element set including numeric data and text data;

a second program code to extract a numeric key concept of the numeric data from each element set of the first time series data;

a third program code to assign a grade to the numeric key concept, the grade representing a degree that the numeric data belongs to the numeric key concept;

a fourth program code to extract a text key concept of the text data from each element set of the first time series data;

a fifth program code to generate a second time series data including a plurality of element sets, each element set including the numeric key concept, the grade, and the text key concept from the respective element set in the first time series data;

a sixth program code to calculate a support of a combination of each numeric key concept and each text key concept from the plurality of element sets of the second time series data, the support being based on the grade of each element set including the numeric key concept and the text key concept matched with the combination; and a seventh program code to extract a frequent time series pattern from the second time series data by referring to the support, the frequent time series pattern being at least one combination of each numeric key concept and each text key concept having the support above a threshold; and an eighth program code to electronically store the frequent time series pattern as an analysis result of the first time series data.

* * * * *